(12) United States Patent
Freeman

(10) Patent No.: US 7,481,932 B2
(45) Date of Patent: Jan. 27, 2009

(54) WATER TREATMENT APPARATUS

(76) Inventor: Brian A. Freeman, 9317 Erickson St., Brooklyn Park, MN (US) 55428

( * ) Notice: Subject to any disclaimer, the term of this patent is extended or adjusted under 35 U.S.C. 154(b) by 654 days.

(21) Appl. No.: 11/231,736

(22) Filed: Sep. 20, 2005

(65) Prior Publication Data
US 2007/0062863 A1 Mar. 22, 2007

(51) Int. Cl.
C02F 1/38 (2006.01)
B01D 21/26 (2006.01)
(52) U.S. Cl. .................. 210/512.1; 209/725; 210/512.2
(58) Field of Classification Search ................ 210/787, 210/512.1, 512.2; 209/725
See application file for complete search history.

(56) References Cited
U.S. PATENT DOCUMENTS
5,248,421 A * 9/1993 Robertson ................ 210/512.1
7,314,559 B2 * 1/2008 Hopper ..................... 210/512.1

* cited by examiner

Primary Examiner—David A Reifsnyder
(74) Attorney, Agent, or Firm—Clayton R. Johnson

(57) ABSTRACT

The water treatment apparatus includes a first and a second fitting adapted for being connected to a supply of fluid and to a container for the treated fluid, a longitudinally elongated rod having a first end mounting the first fitting and a second end mounting the second fitting and a first and a second vortexian spiral tube portion respectively having a first end fluidly connected to the first and second fitting. Each tube portions includes a plurality of loops and a plurality of somewhat linear sections serially connecting adjacent loops to one another. Where each tube portion includes seven loops, advantageously the area encompassed by the loops of each tube in the direction from one fitting to the other is 1:1:2:3:5:8:13:13:8:8:5:2:1:1 with the larger areas loops being fluidly connected to one another.

14 Claims, 2 Drawing Sheets

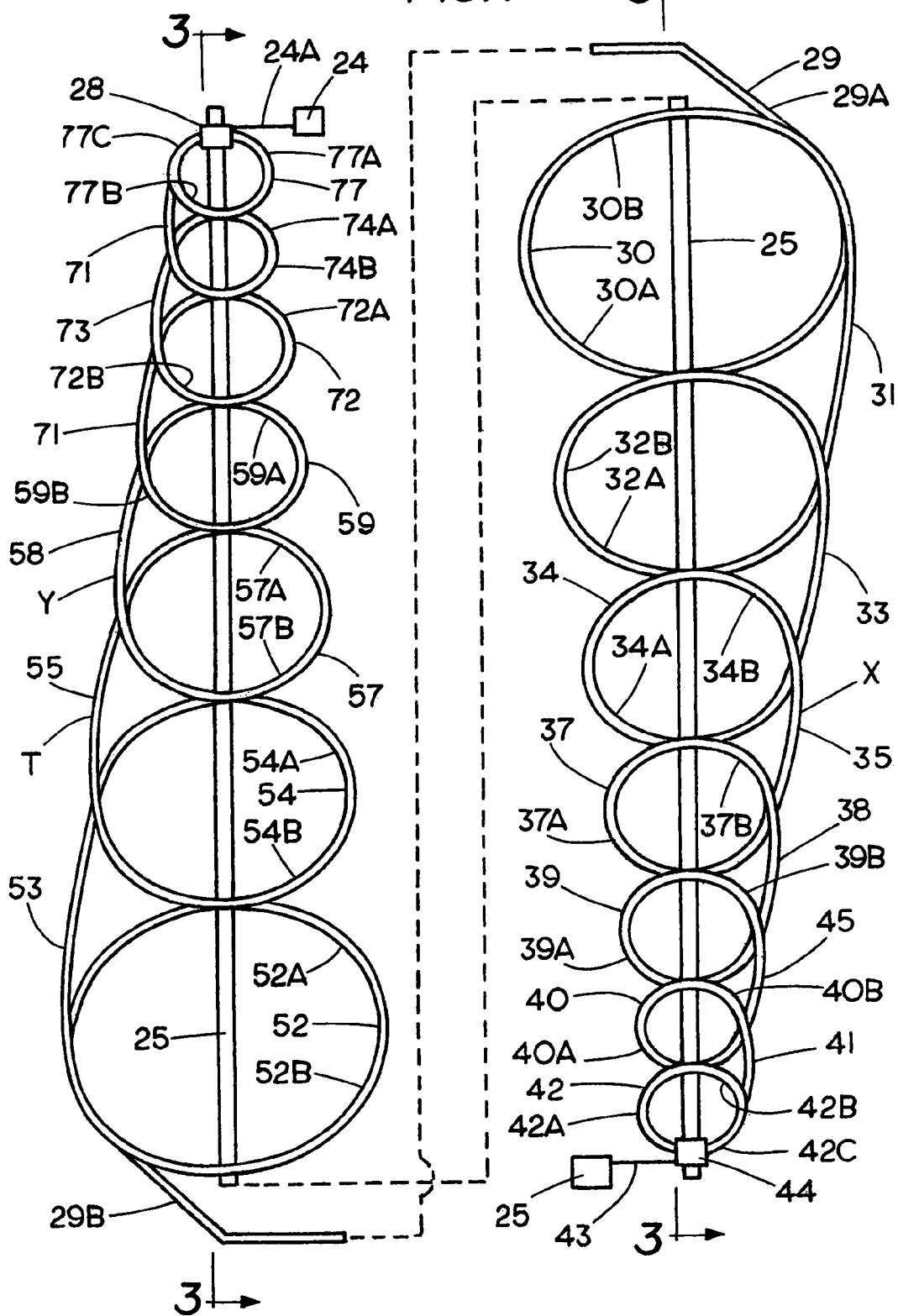

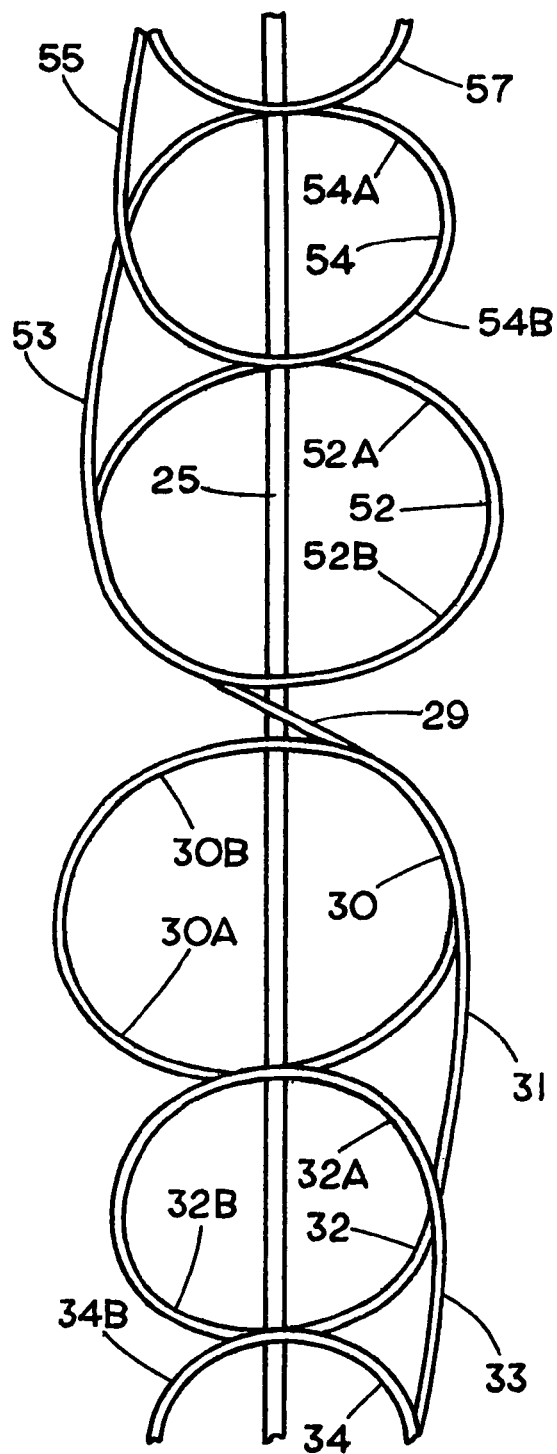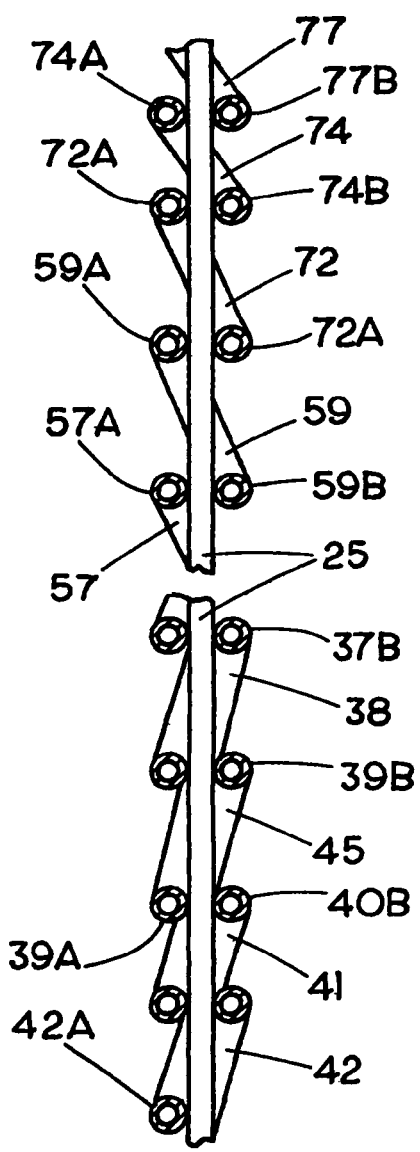

WATER TREATMENT APPARATUS

BACKGROUND OF THE INVENTION

This invention relates to apparatus for conditioning or treating water that is believed to improve the quality of water used in supporting life.

SUMMARY OF THE INVENTION

Applicant believes that the crystalline structure of water is varied as it flows through the apparatus of the invention and thereby improves its life supporting and other qualities. The apparatus includes two fittings with a longitudinally elongated solid metal rod extended therebetween and a tube fluidly connected to the fittings that is of a substantially constant inner diameter along its length between the fittings. The tube includes a pair of elongated vortexian spiral tubes portions symmetrically positioned around the rod with each tube portion having seven helical circular loops extending in fluid conducting relationship to the respective fittings and a tubular connector fluidly connecting the adjacent ends of the largest loops of each of the spiral tube portion to one another. The spiral tube portions have the loops of one tube portion the same size as those of the other tube portion with the loops of one spiral tube portion being wound in clockwise direction and those of the other spiral tube portion in a counterclockwise direction as they extend from one fitting to the other fitting with the rod extending through each of the loops. Advantageously, the area encompassed by the loops of the tube portions in the direction from one fitting to the other is 1:1:2:3:5:8:13:13:8:5:3:2:1:1.

BRIEF DESCRIPTION OF DRAWINGS

FIG. 1 is a view of the invention with the lower portion of the left hand portion joined to the top portion of the right hand portion;

FIG. 2 is a fragmentary longitudinal view of the longitudinal intermediate part of the structure of FIG. 1; and FIG. 3 is a fragmentary longitudinal view that is generally taken along the line and in the direction of the arrows 3-3 of FIG. 1 to show the connection of one of the largest spiral loop portions to the other.

DETAILED DESCRIPTION OF THE INVENTION

The water treatment apparatus of this invention includes a longitudinally elongated, solid rod 25 made of metal, advantageously stainless steel. One end of the rod mounts a fluid fitting 28 and at the opposite end mounts a fluid fitting 44. Fluidly connected to and extending between the fittings 28, 44 is an elongated metal tube T. The tube includes a spiral tube portion X that has one end fluidly connected by a conduit portion 78C to the fitting 28 and a spiral tube portion Y that has one end fluidly connected by a conduit portion 42C to the fitting 44. The opposite end portion of the tube portion X is fluidly connected to the opposite end portion of tube portion Y by a connector portion 29.

The tube portion X in extending from the tubular connector 29 to conduit portion 42C is bent to have several, substantial circular helix loops 30, 32, 34, 37, 39, 40, 42 that are coiled in a clockwise direction with the rod 25 extending through each of these loops. As viewed in plan view (the apparatus being supported on a horizontal surface with the rod being parallel to the surface), each of the loops includes a generally semicircular part designated with A as the last part of the reference number for each of the loops that extends below the rod and a second general semicircular part designated with the letter B as the last part of the reference number for each of the loops that extends above the rod. Desirably the ratio of the areas encompassed in the helical circular loops in a direction from loop 42 to loop 30 is 1:1:2:3:5:8:13.

Each of the semicircular parts (loop portions) of each of the loops 30, 32, 34, 37, 39, 40, 42 that in part includes the letter B as part of its reference number has one end fluidly connected to the one end of the respective semicircular part (loop portion) that in part includes the letter A. Thus, the adjacent ends of loop portion 30A, 30B; 32A, 32B; 34A, 34B; 37A, 37B; 39A, 39B; 40A, 40B; and 42A, 42B are respectively joined to one another. The tube portion X includes one end portion fluidly connected to the end portion 29A of the fluid connector 29 while the opposite end portion 29B is fluidly connected to one end of the tube portion Y. Thus the end portion 29A is fluidly connected to the adjacent end of loop 30A. The other end of loop portion 30B is fluidly connected to the other end of loop portion 32A by a somewhat linear tube portion 31. Likewise, the somewhat linear tube portion 33 fluidly connects the other end of loop portion 32B to the other end of loop portion 34A, the generally somewhat linear tube portion 35 fluidly connects the other end of loop portion 34B to the other end of loop portion 37A, the generally somewhat linear tube portion 38 fluidly connects the other end of loop portion 37B to the other end of loop portion 39A, the somewhat linear tube portion 45 fluidly connects the other end of loop portion 39B to the other end of loop portion 40A and the somewhat linear tube portion 41 fluidly connects the other end of loop portion 40B to the other end of loop portion 42A. The other end of loop portion 42B is fluidly connected to fitting 44 by the conduit portion 42C.

The tube portion Y in extending from connector end portion 29B to conduit portion 78C is bent to have several, substantial circular helix loops 52, 54, 57, 59, 72, 74, 77 that are coiled in a counterclockwise direction with the rod 25 extending through each of these loops. As viewed in plan view, each of the loops of tube Y includes a generally semicircular part designated with A as the last part of the reference number for each of the loops that extends below the rod and a second general semicircular part designated with the letter B as the last part of the reference number for each of the loops that extends above the rod. Desirably the ratio of the areas of the loops of tubular portion Y in a direction from loop 77 to loop 52 is 1:1:2:3:5:8:13.

Each of the semicircular parts of each of the loops 52, 54, 57, 59, 72, 74, 77 that in part includes the letter A as part of its reference number has one end fluidly connected to one end of the respective semicircular part that in part includes the letter B. Thus, the adjacent ends of loop portion 52A, 52B; 54A, 54B; 57A, 57B; 59A, 59B; 72A, 72B; 74A, 74B; and 77A, 77B are respectively joined to one another. The other end of the loop portion 52B is fluidly connected to the other end of loop portion 54A by a somewhat linear tube portion 53. Likewise, the somewhat linear tube portion 55 fluidly connects the other end of loop portion 54B to the other end of loop portion 57A, the somewhat linear tube portion 58 fluidly connects the other end of loop portion 57B to the other end of loop portion 59A, the somewhat linear tube portion 71 fluidly connects the other end of loop portion 59B to the other end of loop portion 72A, the somewhat linear tube portion 73 fluidly connects the other end of loop portion 72B to the other end of loop portion 74B and the somewhat linear tube portion 75 fluidly connects the other end of loop portion 74B to the other end of loop portion 77A. The other end of loop portion 77B is fluidly connected to one end of the tubular connector 77C which in turn is fluidly connected to the fitting 24.

It is noted that each of the sections referred to as "linear" has each of its end portions slightly curved to form a smooth transition to the end part of the loop to which it is joined with the direction of elongation being nearly straight line such as shown in FIG. 1. Thus the somewhat linear sections extends predominantly in a direction from one loop end portion to the adjacent loop end portion while being slightly curved out of a straight line connection between said end portions. Further, the linear sections of one tube portion are on the transverse opposite side of the rod from those of the other tube portion.

The length of each of the tube linear section is about the same or slightly greater than the combined radii of the loops that it is connected to. For example, the length of the generally linear section 31 is advantageously substantially the same as the combination of the outer radii of the loops 30 and 32 while the length of the linear section 58 is advantageously substantially the same as the combination of the outer radii of the loops 57 and 59. Through the provision of the linear sections, the loops of each tube portion are connected in series between the fittings.

The tube portions X and Y as well as tubular connectors 42C, 29 and 77C are of the same metal and may be made of stainless steel or copper and may or may not have their inner and outer surfaces coated with other metals. The pair of tube portions X and Y are of the same size and shape other than from one fitting to the other, one has its loops bent clockwise and the other has its loops bent counterclockwise whereby the linear sections of one tube portion are on the transverse opposite side of the rod 25 from the linear sections of the other tube portion. The rod passes through the central portion of each of the loops.

In use the apparatus of this invention, water may be supplied from a source 24 to flow through the fitting 28 to tube portion Y, connector 29 and tube portion X to the fitting 44 and thence through and tubular connector 43 to the receptacle 23, or alternately from a source 23 to flow through tubular connector 43 to the fitting 44, tube portion Y, connector 29, tube portion Y to fitting 28 and thence through conduit 24A to the receptacle 24. Thus, regardless whether the water flow is from fitting 28 to fitting 44, or from fitting 44 to fitting 28, it is believed the results are the same. The water flowing through the tube may be distilled water.

It is to be understood that the water treatment apparatus may include more than seven loops in each of tube portions X, Y. If more than seven loops are included, the additional loops connected between the loops 30, 52 with each of the additional loops of each of each of the tube portions X and Y being in a ratio that the ones connected to loops 30, 52 being the sum of the last two ratios in the series (8 plus 13) of the preceding two loops and the second added loops being the sum of the two preceding loops (13 plus 21) in the series and so on for each additional pair of loops connected between the loops 30, 52. Thus, if additional loops are added, the same size loops is added to each of tube portions. With the addition of more loops, the rod 25 would be of a greater length and there would additional linear sections extending between loops 30, 52, the tube portions X and Y being of greater lengths.

Although it is preferred that the tube be of stainless steel, it is to be understood they could be made of other materials, an example being titanium. Also, even though it is preferred the liquid flowing through the tubes is water, it could be other types of fluids.

What is claimed is;:

1. Water treatment apparatus, comprising a first fluid fitting, a second fluid fitting, a tube that includes a first tube portion having a first end fluidly connect to the first fitting and a second end, a second tube portion having a first end fluidly connected to the second fitting and a second end and a tubular connector fluidly connecting the second ends of the tubular portions to one another, and a longitudinally elongated rod having a first end portion mounting the first fitting and a second end portion mounting the second fitting in longitudinal spaced relationship to the first fitting, each of the tube portions including several helical loops in series between the ends of the respective tube portion and having the rod extending therethrough.

2. The apparatus of claim 1 wherein each tube portion includes at least three loops that each has a first and a second end and at least one somewhat linear tubular portion extending between the first end of one of the loops and the second end of an adjacent loop.

3. The apparatus of claim 1 wherein each tube portions includes seven generally circular loops with the loops in a direction from the firsts fitting to the second fitting encompass areas in a ratio of about 1:1:2:3:5:8:13:13:8:5:3:2:1:1.

4. The apparatus of claim 3 wherein each of the loops intermediate the loops connected to the fittings is connected to the adjacent loop by a somewhat linear section that extends therebetween.

5. The apparatus of claim 4 wherein each of the somewhat linear sections is of a length that is about the same as that of the combined radii of the loops that it is connected to.

6. The apparatus of claim 1 wherein the tube portions are of a vortexian spiral tubular shape.

7. The apparatus of claim 6 wherein the loops of one of the tube portions are wound in a clockwise direction from the first fitting toward the second fitting and the loops of the other tube portion are wound in a counterclockwise direction from the first fitting toward the second fitting.

8. The apparatus of claim 7 wherein each of the loops intermediate the loops connected to the fittings is connected to the adjacent loop by a somewhat linear section that extends therebetween, the somewhat linear sections of one tube portion being on the transversely opposite side of the rod from the somewhat linear section of the other tube.

9. The apparatus of claim 7 wherein the tube portions are of the same size and shape other than the loops of one tube portion being wound in an opposite direction from the loops of the other.

10. Water treatment apparatus, comprising a first fluid fitting, a second fluid fitting, a tube that includes a first tube portion having a first end fluidly connect to the first fitting and a second end, a second tube portion having a first end fluidly connected to the second fitting and a second end and a tubular connector fluidly connecting the second ends of the tubular portions to one another, and a longitudinally elongated rod having a first end portion mounting the first fitting and a second end portion mounting the second fitting in longitudinal spaced relationship to the first fitting, each of the first and second tube portions including a first loops having a first end fluidly connected to the first and second fitting respectively and a second end, second loops a having first end and a second end fluidly connected to the tubular connector, each tube portion including at least one additional loop having a first end and a second end in series with the respective first and second loop and a somewhat linear section connected between the second end of each additional loop and the first end of the loop that is serially adjacent thereto.

11. The apparatus of claim 10 wherein each of the first loops are of the same diameter and are of substantially smaller diameters than that of the second loops.

12. The apparatus of claim 11 wherein the loops of the first tube portion in a direction from the first fitting to the second fitting are wound in the opposite direction from that of the second tube portion.

13. The apparatus of claim 12 wherein each tube portion is of the same size and each loop of one tube portion encompasses substantially the same area as a correspond loop of the other tube portion.

14. The apparatus of claim 12 wherein each tube portion includes at least 7 loops and the somewhat linear section of one tubular portion is transversely opposite the rod from the somewhat linear section of the other tubular portion.

* * * * *